United States Patent [19]

Greber et al.

[11] Patent Number: 4,952,539

[45] Date of Patent: Aug. 28, 1990

[54] METHOD FOR THE MANUFACTURE OF TRANSPARENT ALUMINUM OXIDE CERAMIC

[75] Inventors: Jörg F. Greber, Schwandorf; Heidemarie Melas, Troisdorf, both of Fed. Rep. of Germany

[73] Assignee: Vereinigte Aluminium-Werke Aktiengesellschaft, Fed. Rep. of Germany

[21] Appl. No.: 302,189

[22] Filed: Jan. 23, 1989

[51] Int. Cl.$^5$ ............................................. C04B 35/10
[52] U.S. Cl. .................................... 501/153; 501/127; 252/315.7; 423/127
[58] Field of Search .................... 501/11, 153, 127; 252/315.7; 423/127

[56] References Cited

U.S. PATENT DOCUMENTS

| | | | |
|---|---|---|---|
| H626 | 4/1989 | Covino | 501/153 |
| 4,357,427 | 11/1982 | Ho et al. | 501/153 |

FOREIGN PATENT DOCUMENTS 3503668  8/1986  Fed. Rep. of Germany.

OTHER PUBLICATIONS

Yoldas, B. E., *Ceramic Bulletin*, vol. 54, No. 3, pp. 286–290, 1975.
Yoldas, B. E., Alumina Gels that Form Porous Transparent $Al_2O_3$, pp. 1856–1860, 1975.
ISO 8008, Aluminium Oxide Primarily Used for the Production of Aluminium-Determination of Specific Surface Area by Nitrogen Absorption-Single Point Method, pp. 1–9, 1986.

*Primary Examiner*—Mark L. Bell
*Assistant Examiner*—David M. Brunsman
*Attorney, Agent, or Firm*—Darby & Darby

[57] ABSTRACT

A method is disclosed for manufacturing transparent aluminum oxide ceramic articles by sintering dry-pressed acid-containing aluminum oxide monohydrate in vacuo or in hydrogen. The method includes obtaining the acid-containing aluminum oxide monohydrate by peptisization of aluminum alkoxide with a mixture of water and acid vapor, with the acid bound to the formed monohydrate by electrostatic force. Such attachment allows ease in separation of the monohydrate crystals in water due to the polarizing effect of the acid. Subsequently, the acid-containing aluminum oxide monohydrate is gelled and dried, with the product, having an acid content of from 12 to 25%, being suitable for forming transparent ceramic articles without requiring calcination.

12 Claims, No Drawings

METHOD FOR THE MANUFACTURE OF TRANSPARENT ALUMINUM OXIDE CERAMIC

FIELD OF THE INVENTION

The present invention relates to aluminum oxide ceramic. More particularly, the invention relates to a method for manufacturing transparent aluminum oxide ceramic from an acid-containing aluminum oxide monohydrate.

BACKGROUND OF THE INVENTION

Aluminum oxide is a starting material for manufacturing ceramics having particularly high hardness and good chemical corrosion resistance. Aluminum oxide ceramic is customarily manufactured by sintering mixtures of aluminum oxide and other oxides. Extremely high-quality formed parts of aluminum oxide ceramic are produced from practically pure aluminum oxide, to which may be added, as a sintering adjuvant, small fractions of MgO or TiO2, such that the resulting ceramic has an $Al_2O_3$ content of 99.7%. Metallurgical grade $Al_2O_3$, produced by the Bayer-Process from bauxite, is typically unsuitable as a starting material for the manufacture of aluminum oxide ceramic, due to interfering impurities such as $Na_2O$—approx. 0.3–0.5%; $SiO_2$- approx. 0.02–0.05%; $Fe_2O_3$ - approx. 0.02–0.05%. Further, metallurgical grade aluminum oxide is too coarse for producing high quality ceramic, having a mediate grain diameter of about 50–100 um. To provide the desired properties in the ceramic, the aluminum oxide must possess uniform characteristics achieved from a relatively precise degree of calcination, combined with proper grinding These characteristics of the aluminum oxide are discussed further below.

For certain applications, a transparent aluminum oxide ceramic having specific characteristics and prepared according to specific methods is required. Transparent aluminum oxide ceramic is particularly useful in the construction of sodium vapor high-pressure electric lamp tubes, because aluminum oxide ceramic provides a high chemical resistance to the aggressive vapor.

The manufacture of transparent aluminum oxide ceramic requires an aluminum oxide of particularly high chemical purity. In particular, the concentration of $SiO_2$, $Fe_2O_3$, $Mn_2O_3$ and other heavy metal oxide impurities in the aluminum oxide, is critical in determining the suitability of the aluminum oxide for the manufacture of transparent ceramic. The reason for this is that the heavy metal oxides and silicon oxides are reduced by sodium vapor under the operating conditions of the sodium vapor high-pressure lamps, resulting in the formation of elemental metal, which in turn leads to a reduction in light transmissibility of the ceramic lamp tube.

A particular difficulty in the manufacture of transparent ceramic is that a sufficiently pure aluminum oxide starting material must be obtained. One known method for obtaining purified aluminum oxide proceeds by way of thermal degradation of ammonium alum, $AlNH_4$-$(SO_4)_2$. Ammonium alum can be purified easily because of its particularly good crystallization properties, resulting in a low impurities content. Other methods of purifying aluminum oxide are based on the fractionation/distillation of volatile aluminum compounds, such as aluminum alkoxide and aluminum alkyl, which can be subsequently degraded to aluminum oxides or its precursors, such as aluminum hydroxide or other aluminum salts.

Both methods generally provide acceptably low levels of impurities, as illustrated by the following limits:

| | |
|---|---|
| SiO2 max | 20 ppm (parts per million) |
| Fe2O3 max | 10 ppm |
| Cr2O3 max | 5 ppm |
| TiO2 max | 10 ppm |
| other elements max | 5 ppm |

The existing technology for the manufacture of transparent ceramic lamp tubes requires highly calcined aluminum oxides in order to attain the necessary properties required for further ceramic processing. In particular, calcination provides a BET surface area of 1-10 $m^2/g$ (BET = nitrogen absorption according to Brunauer, Emmet & Teller (see ISO Standard, Ref.-No.ISO-8008-1986(E)).

The calcination of high-purity oxides is fraught with problems, since, when direct firing is used, impurities can be introduced into the product by the fuel used to produce the heat for calcination. Heating indirectly does avoid this contamination source. However, indirect heating is not readily adaptable to continuous operation, and during batch calcination, the danger exists that, due to the low powder density producing poor heat conductivity, a temperature gradient will occur across the material, creating large differences in the calcination state of the oxide. The calcination state determines the ceramic reactivity of the oxide, and consequently, to obtain uniform sintering, there should be only minor variations in the calcination state. Hence, the processing properties of the calcinated material is not generally acceptable for transparent aluminum ceramic manufacture.

An additional critical aspect of oxide manufacture for use in transparent ceramics is the average particle size of the calcined oxides. The calcined oxides must be ground extremely fine, for the oxides to be subsequently successfully sintered, such that dense formed bodies can be obtained. If properly calcined material is obtained, it is generally hard, requiring contact grinding which presents the danger of contamination of the oxide material by particles abraded from the grinding substance. The contaminating particles can create faults in the sintered product and, consequently, increase the rate of rejects in the manufactured items of transparent ceramic. Therefore, the critical difficulties in the preparation of aluminum oxides for transparent ceramic lies in the calcination and grinding steps of the pure aluminum oxide.

It is known that transparent bodies can be created by sintering aluminum oxide monohydrate gel. However, these bodies are also known to have a high degree of porosity, which precludes their use as lamp tubes, since they are not gas-impermeable.

B. E. Yoldas, [Amer. Ceram. Soc. Buil. 54 (1975) 286 and Journal of Materials Science 10 (1975) 1856], has described that by the pyrolization of formed bodies, produced of aluminum oxide monohydrate gel, transparent but highly porous bodies are formed which may be used as catalyst carriers.

The method developed by Yoldas has the disadvantage that the gel is formed into bodies, which are subsequently dried. During the drying process, there is a danger that tears might appear in the formed bodies due to shrinkage stresses. The tears formed in the bodies during drying do not heal in the calcination process. Accordingly, the method is suitable only for the manufacture of thin layers, for placement on carriers of different types, such as aluminum oxide or another ceramic material. Consequently, the search continues for compositions and methods for producing transparent ceramic while avoiding the known consistency and porosity problems.

SUMMARY OF THE INVENTION

It is an object of the present invention to provide a method for preparing a starting material for transparent ceramic, without requiring calcination and contact grinding of the aluminum oxide.

The foregoing, and other features and advantages of the present invention will become more apparent from the following description.

DETAILED DESCRIPTION OF THE INVENTION

According to the present invention, aluminum oxide monohydrate is used as a starting material for the preparation of a transparent ceramic. The aluminum oxide monohydrate is prepared by hydrolyzing and peptisizing an aluminum alkoxide with a mixture of water vapor and an acid vapor; removing byproduct alcohol from the mixture, leaving a remainder; mixing the remainder with water; heating the mixture until a homogeneous gel is achieved, and drying the gel which comprises an aluminum oxide monohydrate including about 12.5 to 25% by weight acid bound thereto, which, for acetic acid, may be measured as the organic carbon content. Of course, other acids, such as $HNO_3$ cannot be determined by analysis of organic carbon and another appropriate method may be used. The dried gel is then ground to a fineness of, on average, 2 um (microns) before being processed.

"Peptisizing" is a process for forming a gel of the monohydrate which uses acid molecules to form a molecular layer on the monohydrate, which makes the crystals easily separated by water from each other, preferably at elevated temperatures. The resulting gel is opaque and stable, i.e. the peptisized particles do not precipitate from the gel. The acid is "bound" to the monohydrate, which is defined as bonding to the monohydrate by weak forces such as Van Der Waals forces which are electrostatic. The acid does not react with the OH-groups to form aluminum acetate. This electrostatic interaction leads to polarization of the shell of the acid molecules covering the monohydrate, causing the shells to repel each other and supporting separation of the particles in water.

Peptisizing may be achieved by reaction of the monohydrate with any acid. Preferred acids are monobasic acids which disassociate in water to yield only one proton. Of course, various processing differences will be required with some acids. For example, nitric acid or hydrochloric acid could be used, yet these acids may yield corrosive or toxic gasses during sintering. Consequently, an acid such as acetic acid is preferred which yields carbon dioxide during sintering. While acetic acid will discussed hereinafter, it will be understood that the invention is not limited thereby.

Organically bound carbon is used as the indicator of the acid content of the monohydrate because the acetic acid is bound so strongly to the aluminum oxide monohydrate that direct analysis by titration is not possible. Generally, carbon contents ranging from 5 to 10% correspond linearly to acetic acid contents ranging from 12.5 to 25%. While this indirect method is illustrative, it will be understood that other analytic methods may be employed to determine the bound acid content.

The starting material is an aluminum alkoxide, for example, aluminum isopropylate, aluminum butylate, or aluminum ethylate, with the alkoxide hydrolized and peptisized in one step to produce the acid-containing aluminum oxide monohydrate. Of course, the choice of starting material may vary beyond the examples disclosed, as will be evident to one skilled in the art.

An advantage of the present invention is that grinding can be accomplished using non-contact jet mills, which yield an essentially non-contaminated product. Jet mills are suitable for use with the acid-containing aluminum oxide monohydrate, because compared to calcined aluminum oxide, aluminum oxide monohydrate is very soft, and therefore, can readily be reduced to the desired degree of fineness with a jet mill, such as an Alpine-air jet mill which uses dry air or another inert gas for milling. However, other milling apparatus could also be used without product quality loss, so long as the gel is sufficiently ground, to a median grain diameter of about 2 um, without contamination.

The ground acid-containing aluminum oxide monohydrate is therefore suitable for processing according to a "dry-press" method, without further pre-treatment, to supply green (unsintered) bodies, which can then be processed in a vacuum or hydrogen kiln to yield transparent aluminum oxide ceramic bodies. If necessary or desired, sintering adjuvants such as are customarily added in the manufacture of transparent aluminum oxide ceramic, for example, MgO, can be added to the aluminum oxide monohydrate before dry-press processing. Any hydrolyzable magnesium compound, such as magnesium ethylate, can be added to the aluminum alkoxide before the solvolysis, so that the sintering adjuvant becomes distributed homogeneously in the peptized aluminum oxide monohydrate. Magnesium oxide offers the additional advantage of directing crystal growth during sintering, building an even structure, suitable for producing, for example, a sintered transparent high-pressure sodium vapor lamp tube. Of course, other additives could also be used.

The ground, peptized, and dried acid-containing aluminum oxide monohydrate can be processed with compacting machines customarily employed in the ceramic industry for shaping and densifying powders to form green bodies by the dry-press method. The pressing pressures required for green densification are of the same order of magnitude as are customary for ceramic, generally about 50-150 $N/mm^2$ Surprisingly, bodies formed from the- acid-containing monohydrate can be sintered to form dense bodies without intermediary steps of drying or dehydration, with the bodies becoming transparent during sintering. This is all the more surprising, since the reduced green density, which is achieved in dry pressing, is approximately 1 $g/cm^3$ and consequently, based on general experience, it would not be expected that these green bodies could be sintered, practically to the theoretical density of the aluminum oxide, i.e. 3.98 $g/cm^3$ Generally, in processing aluminum oxide into ceramic, commercial oxides must be green densified by at least 50% of the theoretical pure (unalloyed) density so that pure density can be reached during sintering. At a lower green density, it was believed that pure density could not be reached during sintering. It should be noted that the sintering is carried out in a conventional fashion, generally in a vacuum or hydrogen kiln, and that the times and temperatures discussed are illustrative only.

The invention is explained in greater detail in conjunction with the following examples.

EXAMPLE 1

200 kilograms (kg) of isopropyl alcohol and 90 kg of aluminum isopropylate were added to a vessel and heated with stirring to 80° C.. Magnesium ethylate, produced by Dynamit Nobel, Troisdorf, West Germany, was added to the mixture to yield a weight ratio of MgO to $Al_2O_3$ of about 8:10,000. A mixture of acetic acid vapor and water vapor was introduced through an immersion tube into the mixture contained in the stirred vessel. The vapor was produced by vaporization of a mixture of 3.9 kg of acetic acid and 15.8 kg of water in an evaporator. The rate of inflow of the vapor mixture was set by regulating the heating power of the evaporator in such a way that the entire fluid quantity is introduced to the stirred vessel within two hours. During this time, the reaction mixture was maintained at a temperature of 80 C. After the vapor had been completely introduced, stirring continued for an additional three-hour period. Subsequently, both the isopropanol used as a solvent and the isopropanol released during the reaction were removed by distillation from the reaction mixture, leaving a powder residue (remainder).

The powder remaining after distillation was mixed with 50 kg of water. Any remaining isopropanol released was again removed from the stirred vessel by distillation. The stirred vessel was heated, raising the temperature to the boiling temperature of water, approximately 100° C. The reaction mixture was then stirred for five hours to produce a homogeneous mixture. Heating was done in such a way that a weak reflux was maintained. After boiling for 5 hours with weak reflux, the water was distilled off from the vessel at about 100 to 120° C., until a solid dry residue of peptisized and dried aluminum oxide monohydrate containing from 5-10% organically bound carbon was formed. The peptized and dried aluminum oxide monohydrate was removed from the vessel and reduced by milling, preferably with an air jet mill, to an average grain diameter of 2 um.

On a hydraulic press, test samples having the dimension 1 cm×1 cm×0.4 cm were formed from the powder at a pressing pressure of 100 N/mm². The formed bodies were brought to a temperature of 1850° C over a period of 24 hours in an inductively heated vacuum kiln, such as a Balzers kiln model USE 02, with this temperature maintained for five hours. After the heat was turned off, the test samples were cooled in the kiln to about room temperature.

The samples taken from the kiln were transparent and under microscopic examination were determined to have a very uniform structure. Flaking or tearing was not detected on the bodies.

COMPARISON EXAMPLE 1:

200 kg of isopropyl alcohol and 90 kg of aluminum isopropylate were added to a vessel and heated with stirring to 80° C.. Magnesium ethylate was added to the mixture in such a way that a weight ratio of MgO to $Al_2O_3$ of about 8:10,000 resulted. A mixture of acetic acid vapor and water vapor was introduced through an immersion tube into the mixture contained in the stirred vessel. The vapor mixture was obtained by evaporating a mixture of 3.9 kg acetic acid with 15.8 kg water. The rate of inflow of the vapor mixture into the vessel was set by regulating the heating power of the evaporator so that the entire given fluid quantity was introduced over a two hour period. The reaction mixture was maintained at a temperature of 80° C. during this time. After the vapor inflow had been completed, the reaction mixture was stirred for another three hours. Subsequently, the isopropanol used as solvent and that freed in the reaction were removed from the reaction mixture by distillation.

The powder was mixed with 50 kg water, freeing any residual isopropanol which was likewise removed from the vessel by distillation. By heating the stirred vessel, the temperature was raised to the boiling temperature of water, approximately 100° C., and the reaction mixture was stirred for five hours until a homogeneous mixture was produced. Heating was conducted in such a way that a weak reflux was maintained.

After completion of the boiling step, the water was distilled from the stirred vessel at 160 to 180.C until a solid dry residue of peptisized and dried aluminum oxide monohydrate was obtained. The powder remaining after distillation was amber in color. The higher temperature pyrolyses a portion of the acetic acid reducing the amount of acetic acid bound to the aluminum oxide monohydrate. The peptized and dried aluminum oxide monohydrate was taken from the vessel and reduced by crushing or milling with an air jet mill to an average grain diameter of 2 um.

Test samples with the dimensions 1 cm×1 cm×0.4 cm were prepared from the powder using a hydraulic press at a pressure of 100 N/mm² The formed bodies were heated to a temperature of 1850° C. over a 24 hour period, in an inductively heated vacuum kiln. This temperature was maintained for five hours. Subsequently, after the heat was turned off, the samples were allowed to cool in the kiln.

The bodies taken from the kiln were opaque and exhibited signs of flaking. The peptisized and dried aluminum oxide monohydrates obtained in Example 1 and comparison Example 1 have the following composition:

| Relative to AlO3 | Example 1 | Comparison Example 1 |
| --- | --- | --- |
| organically bound carbon | 7% | 4% |
| MgO | 800 ppm | 800 ppm |
| Fe2O3 | 9 ppm | 7 ppm |
| SiO2 | 14 ppm | 17 ppm |
| Cr2O3 | 5 ppm | 5 ppm |

The difference between the processes of Example 1 and comparative Example 1 is that the water is distilled at a higher temperature (160–180 versus 100–120), causing some pyrolysis of the acetic acid. Consequently, the amount of acid bound to the monohydrate is reduced. This is reflected in the difference in bound organic carbon, reduced from 7 to 4 percent. This equates to a reduction in bound acetic acid from 17.5 to 10%. While a relatively small difference, the effect in the final product is dramatic, as a transparent aluminum oxide ceramic is not achieved.

COMPARISON EXAMPLE 2:

Aluminum oxide monohydrate, product no. NB 400 produced by VAW, was calcined in an inductively heated cylindrical rotary kiln manufactured by Smidt Ovens, Netherlands in a continuous operation at a temperature of 1180° C. to yield an aluminum oxide having an effective specific BET surface area of 125 $m^2/g$ (square meters per gram). The oxide was subsequently ground in an air jet mill to an average grain diameter of 2 um. The low degree of calcination allowed use of the jet mill in this example. From this powder, test samples were produced as described in Example 1 which were sintered in a vacuum kiln, as in Example 1.

The bodies taken from the kiln were opaque and exhibited signs of flaking.

COMPARISON EXAMPLE 3:

Aluminum oxide monohydrate, (NB 400) was calcined in an indirectly heated cylindrical rotary kiln to yield an aluminum oxide with a effective specific BET surface area of 16 $m^2/g$. The oxide was ground in an air jet mill to an average grain diameter of 2 um. From the powder, test samples were produced which were subsequently fired under the same conditions as the test samples in Example 1.

The test samples taken from the kiln were opaque and splintering was indicated.

COMPARISON EXAMPLE 4:

Aluminum oxide monohydrate (NB 400) was calcined in an indirectly heated cylindrical rotary kiln to yield an aluminum oxide with a effective specific BET surface area of 7 $m^2/g$. The oxide stuck to the kiln wall, indicating that this material achieved the highest degree of calcination obtainable with this equipment.

The oxide was subsequently ground in contact grinder to an average grain diameter of 2 um. The ground oxide was contaminated by abraded material during grinding From the powder, test samples were produced and subjected to the same sintering conditions as the test samples of Example 1.

The test samples taken from the kiln were not transparent and exhibited signs of flaking. In addition, the abraded material from the grinding step caused dark spots in the test samples.

COMPARISON EXAMPLE 5:

15 kg. of aluminum oxide monohydrate (NB 400) was added in small portions, of approx. 1 kg. each, to 85 kg. of water in a stirrer vessel over a one hour time period. A suspension formed, to which was added 0.75 kg. of acetic acid. The mixture was then agitated for an additional five hours. The agitator was then stopped. The mixture was opaque and solids did not settle out. Subsequently, the suspension was processed in a spray dryer to form a dry granulate, with a mean grain diameter of about 100 um.

The granulate was processed in the same manner as described in Example 1 to form test samples, which were sintered in vacuo in the same way as described in Example 1. The test samples taken from the kiln were opaque and exhibited signs of flaking and tearing.

In the table below the results of the example and the comparison examples are listed. It is evident that the product manufactured according to the invention is markedly better suited for the manufacture of transparent ceramic than the materials investigated as comparisons.

|  | green density at 100 $N/mm^2$ $g/cm^3$ | sinter density $g/cm^3$ | lin. shrinkage % | transparency |
| --- | --- | --- | --- | --- |
| Example 1 | 1.20 | 3.93 | 37.5 | 0.73 |
| Comp. Example 1 | 1.26 | 3.90 | 34.2 | 0.27 |
| Comp. Example 2 | 0.96 | 3.90 | 36.7 | 0.43 |
| Comp. Example 3 | 1.40 | 3.89 | 23.3 | 0.33 |
| Comp. Example 4 | 1.50 | 3.79 | 21.3 | 0.40 |
| Comp. Example 5 | 1.01 | 3.68 | 33.8 | 0.48 |

The transparency was measured with a fully automatic computerized microscope, which performs a quantitative picture analysis (TAS-Plus, produced by TAS/Leitz Co.). Principally, it is a microscope with a TV camera which uses a digitized image and statistical analysis to determine variations in the light intensity of the test samples. A transparency of "1" indicates that the sample allows all irradiated light to pass through completely, while a value of "0" indicates that the sample is impermeable to light.

Producing an acid containing aluminum oxide monohydrate in one step by combining hydrolysis of an aluminum alkoxide with the peptisizing of the resultant monohydrate offers substantial benefits in terms of manufacture of a purified material suitable for forming transparent ceramic articles without calcination. The material is soft and easily ground with non-contact grinding means, avoiding contamination. In addition, the overall yield of transparent articles is increased as variations in part quality are reduced. The fact that the acid containing aluminum oxide monohydrate is readily processed to a solid transparent ceramic is surprising in view of the Yoldas teaching that high porosity is required to achieve transparency.

While the invention has been described using acetic acid, it will be understood by those skilled in the art that various other acids could be used with the present invention. In addition, other modifications to the processing steps could be made without varying from the scope of the present invention.

Having thus described the invention, what is claimed is:

1. A method for preparing an acid-containing aluminum oxide monohydrate for use in producing transparent ceramic comprising:
   providing an aluminum alkoxide in a solvent;
   peptisizing and hydrolyzing the aluminum alkoxide with a mixture of water vapor and an acid vapor;
   removing the solvent and any distillable byproducts from the mixture, leaving a residue;
   adding water to the residue;
   heating the residue and water until a homogeneous gel is produced; and,
   drying the gel which comprises an aluminum oxide monohydrate including about 12.5 to 25% by weight acid bound thereto.

2. The method of claim 1 further comprising non-contact grinding the dried gel to a fineness of about 2 microns.

3. The method of claim 1 wherein the water vapor and acid vapor is produced by evaporating a water and acid mixture.

4. The method of claim 1 wherein the acid vapor is a monobasic acid.

5. The method of claim 4 wherein the acid vapor is from the group consisting essentially of acetic acid, hydrochloric acid and nitric acid.

6. The method of claim 1 wherein the aluminum alkoxide is from the group consisting essentially of aluminum isopropylate, aluminum ethylate, and aluminum butylate.

7. The method of claim 1 wherein the acid-containing aluminum oxide monohydrate includes from 15 to 22.5% acid bound thereto.

8. The method of claim 2 further comprising dry-pressing the ground acid-containing aluminum oxide monohydrate to a desired shape at a pressure sufficient to produce a green body.

9. The method of claim 8 further comprising sintering the green body at a temperature and for a time sufficient to produce a solid transparent ceramic article.

10. The method of claim 1 wherein the solvent and distillable byproducts are removed by distilling at the boiling point thereof.

11. The method of claim 1 wherein the residue and water are heated to a temperature of about 100° C.

12. The method of claim 1 wherein the aluminum oxide monohydrate includes about 17.5% by weight acid bound thereto.

* * * * *